Figure 1:
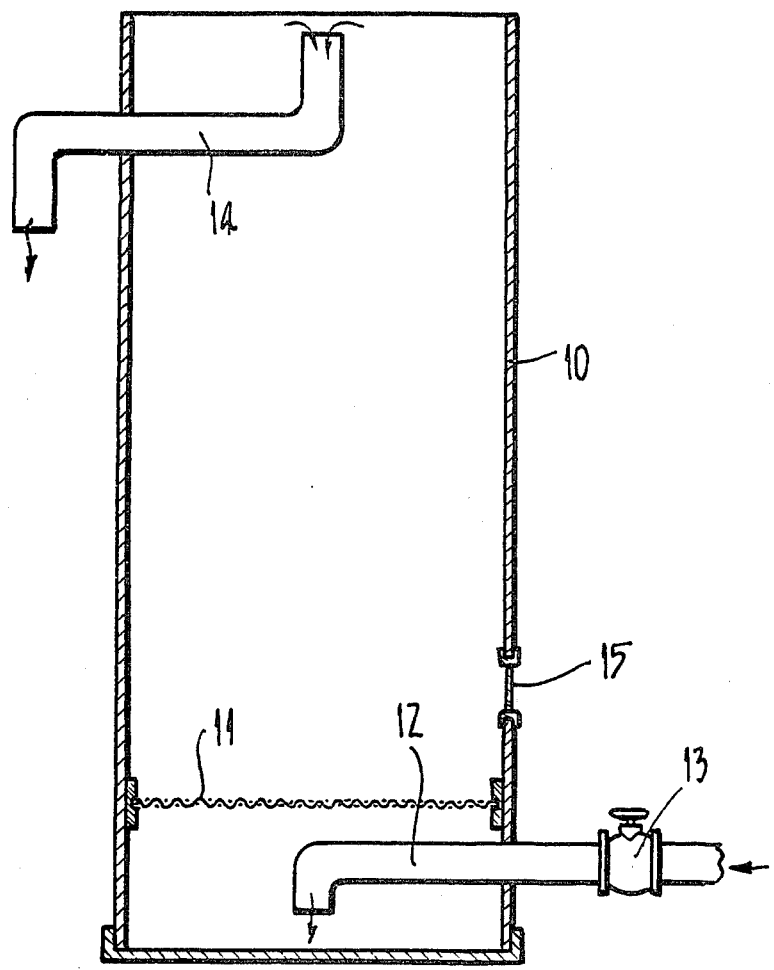

United States Patent [19]

O'Sullivan et al.

[11] 4,438,725

[45] Mar. 27, 1984

[54] METHOD OF GROWING MOLLUSCS

[75] Inventors: Brendan W. O'Sullivan, Dublin, Ireland; Leo J. Leggett, Salisbury East; Maxwell V. Melvin, Brighton, both of Australia

[73] Assignees: ICI Australia Limited, Melbourne; State of South Australia, Adelaide, both of Australia

[21] Appl. No.: 347,981

[22] Filed: Feb. 11, 1982

[30] Foreign Application Priority Data

Feb. 11, 1981 [AU] Australia ............................ PE7551

[51] Int. Cl.³ ............................................ A01K 61/00
[52] U.S. Cl. ........................................................ 119/4
[58] Field of Search ............................................ 119/4

[56] References Cited

U.S. PATENT DOCUMENTS

| | | | |
|---|---|---|---|
| 3,298,354 | 1/1967 | Geer, Jr. .................................. | 119/4 |
| 3,486,486 | 12/1969 | Vanderborgh, Jr. et al. ......... | 119/4 |
| 3,495,573 | 2/1970 | Vanderborgh, Jr. et al. ......... | 119/4 |
| 3,517,648 | 6/1970 | Budge ...................................... | 119/4 |
| 3,701,338 | 10/1972 | McMillin ................................. | 119/4 |
| 3,913,525 | 10/1975 | Plocek .................................... | 119/2 |

FOREIGN PATENT DOCUMENTS 2016651 12/1969 France .
2452876 10/1980 France .

Primary Examiner—Hugh R. Chamblee
Attorney, Agent, or Firm—Cushman, Darby & Cushman

[57] ABSTRACT

Method of growing molluscs, such as oysters, which comprises inducing larvae to settle on small particles of cultch and subsequently maintaining the particles of cultch with spat attached in suspension in a liquid growing medium until they have reached the size appropriate for them to be used as seed molluscs.

16 Claims, 1 Drawing Figure

METHOD OF GROWING MOLLUSCS

TECHNICAL FIELD

The present invention relates to the culture of bivalve molluscs; in particular, but not exclusively, to the culture of oyster seed.

Although various species of bivalve molluscs have different life cycles, they all have in common a free swimming larval stage. For example, when larvae of oysters have grown to a size of about 200-250 microns, which is known as the 'eyed larva' or pediveliger stage, they seek to settle on to a solid substrate. The larvae then change their structure and become juvenile oysters (spat). The juvenile oysters, after about 4 days, develop substantial shells, one of which is permanently attached to the substrate.

BACKGROUND ART

When oysters reproduce and grow in nature, at every stage of their development they are susceptible to predators and disease. The mortality rate during the larval stage is estimated to exceed 99%.

Oysters have been grown and harvested for a long time. In some locations cleaned, empty, oyster shells are immersed in waters where oyster larvae are known to occur naturally. The larvae settle on the oyster shells which are in effect an artificial substrate; this is known as cultch. The juvenile oysters either attached to the cultch or removed from it are used as seed oysters for planting in oyster beds. Increasing demand for oysters has led to the development of processes for the more efficient culture of seed oysters suitable for planting in oyster beds to be grown to commercial maturity by any one of the various methods well known to those skilled in the art.

The artificial culture of seed oysters involves obtaining larvae from brood oysters, growing then in carefully controlled conditions and feeding them with appropriate algae. When they are at the eyed-larva stage they are induced to settle on an artifical cultch in a manner which is convenient to their subsequent culture, generally in beds in the sea or in an estuary.

Processes have been developed to produce cultch-free seed in the form of separate, individual animals unattached to any form of substrate. In such processes the eyed-larvae are induced to settle on a temporary cultch surface, such as a plastic or lead sheet as is disclosed is U.S. Pat. No. 3,526,209 or a mesh as disclosed in U.S. Pat. No. 3,495,573. After most of the larvae have set but before their shells become permanently attached to the cultch, they are washed or brushed from the temporary cultch assisted by a strong jet of water. This yields cultch-free spat which are then placed in spat trays where they are fed with appropriate algae. When the cultch-free spat have grown to such a size that they are capable of surviving in the open water situations they are used as seed for cultivation to maturity.

In British Pat. No. 1 366 394 a method of operating the spat trays involving bubble agitation of the culture medium is disclosed. This agitation causes the separate, cultch-free spat to be in a pseudo free swimming state even though the spat themselves are incapable of swimming under their own motive power. The potential advantages claimed for having the spat in this pseudo free-swimming state in the spat trays in contrast to the conventional stationary state on a suitable supporting tray were the rapid removal of potentially self-toxic metabolites the spats produce, the more efficient presentation of the food algae, and the inhibition of bacterial infection which can occur through the physical damage caused by the removal of the spat from the cultch.

DISCLOSURE OF INVENTION

We have now found a process by which separate spat on cultch can be produced using a particulate form of cultch which are ideally suited for subsequent cultivation to separate seed oysters using an agitated culture medium. This process is applicable to all bivalve molluscs which at some stage in their natural life cycle attach themselves to a solid substrate.

Accordingly the present invention provides a process of cultivating bivalve molluscs wherein first a particulate cultch material, hereinafter referred to as micro-cultch, is prepared by screening particles using an oversize screen and a fines screen such that the said particles are in the size range of 50 microns to 500 microns, secondly an aqueous culture containing free swimming bivalve mollusc larvae at the eyed-larva stage is brought into contact with the said micro-cultch, thirdly, after at least 20% by number of the free-swimming larvae have settled from the culture medium, the micro-cultch material in a second screening step is passed over a screen of substantially the same dimensions as those of the said oversize screen, and fourthly the oversize fraction from the second screening operation, which comprises particles of micro-cultch material with a settled larva called spat attached to each particle, is transferred to a series of one or more spat culture tanks in which the spat are maintained in suspension whilst they are allowed to grow to a size suitable for use as seed in subsequent bivalve mollusc cultivation operations.

The bivalve molluscs which are suitable for cultivation by the process of this invention are those which, at some stage in their natural life cycle, attach at least one of their two shells to a solid substrate.

Examples of such bivalve molluscs include those commonly described as oysters, mussels, clams and scallops.

Hereinafter, for convenience, the invention is described by reference to oysters, but limitation to this type of bivalve mollusc is not implied, the process of the invention is applicable to all bivalve mulluscs hereinbefore defined.

Examples of oysters to which the process of this invention is applicable include:
British or flat oyster: *Ostrea edulis*
Mud oyster: *O. angasi*
Pacific oyster: *Crassostrea gigas*
Sydney rock oyster: *C. commercialis*
Slipper oyster: *C. eradelie*
Mangrove oyster: *C. rhizophorae*
Easter American oyster: *C. virginica*
Portugese oyster: *C. angulata*

Oyster larvae will settle on and attach themselves to a large variety of materials. The chemical nature of the micro-cultch material is not an essential feature of this invention other than it shall not be such as is repellent to the larvae nor such as cannot be reduced to the appropriate particulate form. One specific material which it has been found to be suitable is the crushed shells of molluscs, in particular seamussels, (*Mytilus edulis*) and this provides a preferred micro-cultch material for the process of this invention.

The particle size of the micro-cultch is a critical feature. Most oyster larvae at the eyed-larva stage are about 200 to 250 microns in size. Ideally the size range of the particles of the cultch material should be from approximately the same size as the smallest of the larvae. By way of illustration and without limiting the invention, if the larvae size range is from X microns up to Y microns, the particle size range of the cultch should be from approximately X up to 1.25 Y microns.

We prefer to use cultch material in the size range of 200 to 350 microns.

The shape of the particles is not critical but preferably it is such that it is of consistent size and shape and does not impede the screening operations. Micro-cultch particles which are in the form of platelets are a preferred form.

The settling time required depends on the stage of development to which the larvae have reached when they are brought into contact with the cultch material. Generally the majority of the larvae, if they are at the eyed-larva stage, will have settled after 5—7 days.

The second screening step may be carried out as a single operation, in which case it is preferred that at least 80% by numbers of the larvae will have settled out before the second screening step is carried out.

The second screening step preferably comprises a number of repetitive screening operations, conveniently carried out on a daily basis, in which those spat which have settled out are screened out whilst the remaining free swimming larvae and unattached pediveligers are kept in contact with the micro-cultch. The series of screening operations is conveniently started when at least 20% by number of the larvae have settled. The percentage of larvae settled can be determined by counting the number of larvae remaining in a known volume of the culture medium. The screening operations to recover the spat are continued until approximately 20% by number of the larvae remain unattached to the micro-cultch. The last larvae to settle are generally undersized and malformed, and do not grow into strong seed oysters.

The spat recovered during the second screening step may be transferred immediately to a spat culture tank, or preferably they are allowed to stabilize in a tray with a mesh bottom for a few days and then transferred to a spat culture tank.

The cultivation of the spat is carried out in the series of spat culture tanks until the spat have grown to a size suitable for use as seed in subsequent oyster cultivation operations. Preferably the spat are grown to a size of approximately 4 mm. If there is more than one tank in the series, it is preferable to maintain a close size range of spat in each tank. This is achieved by regular, generally on a weekly basis, screening of the spat in each tank, transferring the largest spat from that tank to the one accommodating the next largest size range.

The method of agitation of a spat culture tank is important. Mechanical agitation is unsuitable because the spat can be damaged by the action of the agitator. Agitation by aeration is suitable. In this procedure the culture tanks are filled with suitably purified sea water which is heated to the optimum temperature for spat growth. The sea water is agitated by a stream of air injected into the bottom of the tank which keeps the spat suspended in the sea water. A suspension of cultured algae is added daily to feed the spat. Periodically, typically every two to four days, the spat are filtered from the sea water and placed into a fresh batch of purified sea water in order to remove the toxic products they produce.

Although this conventional process of spat culture is satisfactory in many situations it has disadvantages which include the possibility of the spat being carried out of the sytem in the air-bubbles, the need to provide nutrients and the time-consuming handling operations involved.

BEST MODE OF CARRYING OUT THE INVENTION

We have now found that a better form of agitation culture of spat is provided by a fluidized bed technique using a continuous flow-through supply of filtered sea water. Fluidization is defined in the Condensed Chemical Dictionary (9th Edition—Van Nostrand Reinhold Company) as "A process in which finely divided solid is caused to behave like a fluid by suspending it in a moving gas or liquid". If sea water is caused to flow up through a vessel containing a mass of micro-cultch particles with spat attached at a velocity such that the fluid drag force, (ie pressure drop times vessel cross-sectional area), just equals or is greater than the weight of the particles, the particles will be fluidized and thus maintained in suspension.

Accordingly in a preferred embodiment of the process of our invention there is provided a process of cultivating bivalve molluscs according to the process hereinbefore described wherein the said spat attached to particles of micro-cultch are grown by a suspension culture technique using a fluidized bed technique in which the culture medium is continuously passed through a mass of the said particles of micro-cultch at a velocity at least equal to that required to maintain the particles in suspension.

The advantages we have found using a fluidized bed technique are more uniform and rapid grown and the ability to grow spat up to 4 mm in size, which is an ideal size at which to transfer them to mesh baskets in the open water.

In those situations in which a plentiful supply of sea water is not available to act as the fluidizing medium, the fluidizing medium may be recycled to the fluidized bed after appropriate purification. Preferably a flow-through system is used with the overflow from the fluidized bed going to waste; this prevents the build-up of toxic metabolites in the system. An algal culture which provides feed for the spat can be injected into the fluidizing sea-water stream but it is not always necessary. Because the spat are coming into contact with a much greater volume of sea water than they would do in stationary or even air-agitated batch culture tanks, the food materials present in natural sea-water are often sufficient to supply the nutrients required and additional artificial feeding may not therefore be necessary.

An advantage of this embodiment of our invention is that it provides means of rearing large numbers of oyster seed in a relatively small convenient plant. For example, a fluidizing chamber comprising a hollow vertical cylindrical vessel of 235 mm internal diameter and an effective height of 900 mm holds $5 \times 10^6$ particles of micro-cultch with freshly-set spat attached. Moreover when a flow-through process is used natural sea water can be utilized which will provide all the required nutrients thus obviating the necessity to grow algae to provide added nutrients. Although the rate of growth is dependent on specific local conditions and valid comparisons are difficult to make, the method of the present invention, particularly using a fluidized spat culture technique, encourages rapid growth of spat, typically, spat 4 mm in size have been grown in 20 days from settling.

We also provide apparatus for carrying out the process of our invention. Preferred embodiments of the process and apparatus of the invention are now illustrated with reference to the accompanying drawing. However, it is to be understood that the following description is by way of example only and the process and apparatus of the invention is not to be construed as restricted to these preferred embodiments.

In the drawing:

FIG. 1 is a diagrammatic representation of the fluidizing chambers into which the spat from the settling units are transferred.

Referring to the drawing, FIG. 1 shows a vertical cylindrical vessel 10 fitted with a mesh screen 11 placed above the bottom of the vessel. An inlet pipe 12 fitted with a valve 13 enters the bottom of the vessel below the mesh screen 11. An outlet pipe 14 is fitted to the upper part of the vessel and an observation window 15 is set above the screen 11.

In operation sea water is pumped into the vessel 10 through the inlet pipe 12 at a rate controlled by the valve 4. Spat are transferred from the settling units or stabilizing trays and placed on the mesh screen 11. Sea water is now pumped through the inlet pipe 12 at a rate such that the spat are maintained in suspension but are not carried over into the outlet pipe 14. Control of the rate of sea water entering the vessel is based on observation of the state of the suspension of the spat through the window 15.

When the spat have grown to a suitable size they are removed by screening and placed in a similar fluidizing chamber containing a screen mesh of the appropriate size to retain the grown spat.

This process is continued with further fluidizing chambers until the spat have reached a suitable size for use as seed in cultivation operations.

INDUSTRIAL APPLICABILITY

It has been observed that the spat grown by the method of the invention on micro-cultch are of more uniform and better shape than spat grown by conventional methods on massive cultch. The oyster spat generally follows the contours of the cultch material and this can give rise to undesirable shell deformation.

The use of micro-cultch also has the advantage over cultchless processes in that the spat is not detached from the cultch. The act of detaching the spat is liable to cause damage to the shell of the oyster which, if severe, can cause death of the animal or provide a site for subsequent bacterial infection or predator attack.

The screening operations which are an integral part of the process of this invention provide a convenient means of culling out the weak and slow growing individual animals.

The invention is now illustrated by, but not limited to, the following example.

Free swimming larvae of the Pacific oyster (*C. gigas*) were reared in 20,000 litre tanks containing heated processed sea water. The sea water was renewed every 4-7 days and the larvae screened and washed. After 12-16 days the larvae developed an eye-spot and foot and became pediveligers; at this stage they were actively searching for a suitable substrate to attach to. The tank was drained and the pediveligers screened through a series of sieves. Those retained on a 250 micron screen were placed in settlement units consisting of shallow plastic sided trays (500 mm × 500 mm) with a sieve base of 210 microns mesh.

The substrate supplied to the pediveligers in the settlement units was finely ground autoclaved mussel shell screened through a 350 micron sieve and retained on a 210 micron sieve. The shell particles were spread evenly to a depth of 500 micron on the trays. The pediveliger larvae were added to the trays at a density of $0.5-1.0 \times 10^6$ per tray. The trays were immersed to a depth of 10-15 mm in tanks of recirculating heated processed sea water. The settlement units were closed systems and sea water was distributed over the settlement trays by sprinkler bars.

The pediveligers were fed daily and allowed to settle for 5 days. Screening was carried out daily and the newly settled spat were caught on a 350 micron screen and transferred to a separate system of spat trays similar to those in the settlement units. In the first screening 40% by numbers of the larvae were removed, subsequent screenings removed 20%, 10% and 10% of the total number of larvae present originally, 20% of the larvae failed to set. The set spat were stabilised and allowed to grow in the closed recirculating units for a further 5-7 days before being transferred to the open fluid bed system which consisted of a series of three similar fluidizing chambers.

The first fluidizing chamber was of the design shown in FIG. 1. The vertical cylindrical vessel 10 was of 235 mm diameter and was fitted with a 350 micron mesh screen (11) 130 mm above the bottom of the vessel. The outlet pipe was fitted in such a manner that the water level maintained in the vessel was 900 mm above the bottom of the vessel.

The second and third fluidizing chambers were of substantially the same size shape and construction, and differed only in being fitted with mesh screens of 1 mm and 2 mm respectively.

The spat were transferred from the stabilizing units and placed on the mesh screen. Sea water was pumped through the inlet pipe at such a rate that the spat were maintained is suspension but not so fast that they were carried over into the outlet pipe. Control of the rate of sea water entering the vessel was based on observation of the state of suspension of the spat through the sight-glass.

The fluid bed system operated with three spat sizes, using a separate fluidizing chamber for each size. The spat sizes, graded by screen size were:

(a) greater than 350 micron, less than 1 mm—noted as '350 micron' spat.

(b) greater than 1 mm, less than 2 mm—noted as '1 mm' spat.

(c) greater than 2 m, less than 4 m—noted as '2 mm' spat.

Settled spat were placed initially in the fluidizing chambers for 350 micron spat. They were screened weekly and, as they grew, were move progressively through the 1 mm and 2 mm chambers. When the spat were large enough to be retained on 4 mm mesh they were placed in mesh pouches on racks in the farm.

Spat density for the 2 mm size in a properly fluidizing chamber was 30-50 spat per cubic centimeter under which conditions the growth rate during the summer was approximately 1 mm per week. The only nutrients available to the spat were those naturally contained in the sea water used.

We claim:

1. In the process of cultivating bivalve mollusc on micro-cultch, the improvement comprising a first step of preparing the micro-cultch by screening particulate matter using an oversize screen and a fines screen to produce particles in the size range of 50 microns to 500 microns, a second step of contacting an aqueous culture containing free-swimming bivalve mollusc larvae at the eyed-larvae stage with the said micro-cultch, a third step of screening the aqueous culture with a screen of substantially the same dimensions as the said oversize screen when at least 20% of the free-swimming larvae have become spat, and a fourth step of growing the screened spat to the seed stage in a culture medium wherein the spat are maintained in suspension.

2. A process according to claim 1 wherein the third step comprises a series of daily screenings.

3. A process according to claim 1 wherein the spat removed from the aqueous culture during the third step are allowed to stabilize prior to the start of the fourth step.

4. A process according to claim 1 wherein the fourth step is continued until substantially all of the spat are at least 4 mm in size.

5. A process according to claim 1 wherein the culture medium is sea water.

6. A process according to claim 1 wherein the bivalve molluscs are oysters.

7. A process according to claim 6 wherein the oysters comprise one or more of the species *Ostrea edulis, Ostrea angasi, Crassostrea commercialis, Crassostrea eradelie, Crassostrea rhizophorae, Crassostrea virginica* and *Crassostrea angulator.*

8. A process according to claim 6 wherein the oysters comprise the species *Crassostrea gigas.*

9. A process according to claim 1 wherein the particulate matter comprises crushed mollusc shells.

10. A process according to claim 9 wherein the mollusc comprises *Mytilus edulis.*

11. A process according to claim 1 wherein the particulate matter is in the form of platelets.

12. A process according to claim 11 wherein the said particles are in the size range of 200 microns to 350 microns.

13. A process according to claim 12 wherein the third step is carried out after at least 80% of the free-swimming larvae have settled.

14. A process according to claim 1 wherein in the fourth step wherein the spat are maintained in suspension by fluidization means.

15. A process according to claim 14 wherein the fluidization means comprise a continuous flow of culture medium at a velocity at least equal to that required to maintain the spat in suspension.

16. A process according to claim 15 wherein the culture medium is continuously recycled.

* * * * *